United States Patent [19]

Korlatzki et al.

[11] 4,174,436

[45] Nov. 13, 1979

[54] POLYURETHANES AND FOOD CASINGS MADE THEREFROM

[75] Inventors: Rudi Korlatzki, Laudenbach; Günter Schumacher, Weinheim, both of Fed. Rep. of Germany

[73] Assignee: Naturin-Werk Becker & Co., Weinheim, Fed. Rep. of Germany

[21] Appl. No.: 926,541

[22] Filed: Jul. 20, 1978

Related U.S. Application Data

[62] Division of Ser. No. 753,694, Dec. 23, 1976, Pat. No. 4,123,589.

[30] Foreign Application Priority Data

Dec. 31, 1975 [DE] Fed. Rep. of Germany ....... 2559318

[51] Int. Cl.² .................. C08G 18/42; B32B 27/40; A22C 13/00
[52] U.S. Cl. .................................. 528/80; 138/118; 138/118.1; 138/177; 528/83; 528/906
[58] Field of Search .................. 528/80, 83, 906

[56] References Cited

U.S. PATENT DOCUMENTS

| | | | |
|---|---|---|---|
| 2,914,556 | 11/1959 | Hostettler et al. | 260/77.5 AN |
| 3,591,561 | 7/1971 | Kazama et al. | 260/77.5 AN |
| 3,642,397 | 2/1972 | Schippers et al. | 425/382 |
| 3,746,665 | 7/1973 | Koleske et al. | 260/77.5 AN |
| 3,752,694 | 8/1973 | Sayigh et al. | 428/425 |
| 3,763,079 | 10/1973 | Fryd | 428/425 |
| 3,926,706 | 12/1975 | Reifenkauner et al. | 264/173 |
| 4,051,111 | 9/1977 | Holloway | 528/80 |
| 4,055,549 | 10/1977 | Roberts | 528/80 |

OTHER PUBLICATIONS

Union Carbide Corp. Product Bulletin : NIAX Polyols D-510, D-520 and D-560, Apr. 1965.
Bayer-Vulkollan Urethan Elastomer-not dated.

*Primary Examiner*—H. S. Cockeram
*Attorney, Agent, or Firm*—Brumbaugh, Graves, Donohue & Raymond

[57] ABSTRACT

A novel elastic polyurethane having outstanding properties for use in making mono- and multi-layer food casings, more especially sausage casings, by extrusion. Stretching, especially biaxial stretching, gives further improvement. The casings can be boiled and scalded without folding or wrinkling when cooled. The polyruethane comprises a particular combination of components which imparts the desired properties.

18 Claims, No Drawings

POLYURETHANES AND FOOD CASINGS MADE THEREFROM

This is a division of our copending application Ser. No. 753,694 filed Dec. 23, 1976, now U.S. Pat. No. 4,123,589.

This invention relates to elastic polyurethanes, to food casings having at least one layer made from the polyurethanes, more especially sausage casings, and to processes for the manufacture of such casings.

Food casings according to the invention are especially suitable for boiling and scalding sausages which, after filling, are heated in water or steam to temperatures of approximately 70° to 100° C. The following problem occurs with these sausage goods: on heating, which is usually carried out in a boiling or scalding vessel, the volume of the sausage material increases and the casing material expands with it. Although the sausages are initially taut and practically wrinkle-free and are therefore of satisfactory appearance, when the sausage cools down after scalding or boiling, occurring from the outside inwards, the volume of the sausage material is reduced again and the sausage casing shrinks—but only partly to the state it was in before heating. As a result the sausage has a wrinkled and unpleasant appearance. The consumer, however, equates a wrinkled and unpleasant appearance with goods that are no longer fresh and therefore prefers to buy taut and wrinkle-free sausages.

Attempts have been made to overcome this problem by coating a hydrophilic film material, such as cellulose, with a polymer which is impermeable to water vapour. In such a multi-layer film, the outside is formed by the cellulose, usually a tube of regenerated cellulose material reinforced by cellulose fibres, which contains on the inside facing the sausage material, a layer of a polymer which is impermeable to water vapour. The coating of the cellulose tube may be effected either from the outside or from the inside. In the case of coating from the outside the cellulose tube must be inverted, as a result of which continuous manufacture of the coated tube is not possible. Coating from the inside requires a comparatively complicated processing method.

Another previous proposal consists of using multi-layer composite films made of various thermoplastic materials as sausage casings for encasing boiling and scalding sausages, but these previously proposed multi-layer films of thermoplastic materials, like the single layer films, have the undesired property that after the content has cooled they become wrinkled and longitudinal folds form because the casing does not exhibit the same volume contraction as the filling material on cooling. In the case of single or multi-layer films of synthetic materials, such as thermoplasts, attempts have been made to overcome this problem by giving the tubular films a definite shrinking behaviour by means of a specific stretching process following manufacture. It is only possible to obtain a sausage free from wrinkles, however, if after cooling, that is at least a few hours after the manufacturing process, or better, the next day, it is immersed for a few seconds in boiling water. In this reheating to a temperature higher than in the scalding treatment, the tubular film shrinks again to a certain extent so that even after cooling it surrounds the filling material smoothly, without any wrinkles. Such an additional hot water treatment, however, called "compressing" by those skilled in the art, complicates the manufacture of the sausage and is therefore carried out only with reluctance by many manufacturers.

To obtain a wrinkle-free sausage casing combinations of films have also already been proposed, in which a water-impermeable inner layer consists of polyamide 11 or 12 and the outer layer of polyamide 6. The water-absorbing capacity of the outer layer of such film combinations of co-extrudable thermoplasts can be increased by treating the outer layer with acid. In such sausage casings, the outer layer shrinks on drying and a relatively taut covering of the sausage material is achieved as a result. No "compressing" treatment is necessary. The freedom from wrinkles of a sausage casing of this type is not, however, optimal. After removing the sausage from cold-storage it is necessary to store it at room temperature for a relatively long period in order to obtain a reasonably wrinkle-free appearance. Accordingly, sausages that have been removed from cold-storage and placed straight on the sales counter require some time before their appearance is satisfactory.

Similar considerations apply to sausage casings, also previously proposed, that are based on multi-layer films in which the inner layer is a physiologically tolerable thermoplast and in which the wrinkle-free fit is intended to be achieved by the stiff rubber-elastic properties of the outer layer. In addition, both of the above-described sausage casings essentially consist of multi-layer films, which are more expensive to produce than single films.

Attempts have also already been made to overcome the problem of achieving a wrinkle-free fit of the sausage casing over the sausage material by means of a one-layer casing made of polyvinylidene chloride that has been stretched to a high degree or made of a copolymer consisting of 70–90% vinylidene chloride and 30–10% of vinyl chloride. Such sausage casings are, however, also less than optimal as regards freedom from wrinkles. Furthermore, polyvinylidene chloride can be extruded only with great difficulty. It has only a very narrow melting range of between 140° and 145° and splits off HCl, thereby necessitating the use of acid-resistant and therefore very expensive extruders. In addition, polyvinylidene chloride is thermally unstable. The thermal decomposition is auto-catalysed by the hydrochloric acid that is split off. Consequently polyvinylidene chloride cannot be extruded as often as desired. In addition, because of the stickiness of the film, sausage casings of polyvinylidene chloride cannot be produced or stored without using a separator material. Also, polyvinylidene chloride is comparatively expensive and does not extrude particularly well with other plastics materials.

It is accordingly an object of the present invention to provide a food casing, generally a sausage casing, more especially for boiling and scalding sausages, which is improved in comparison with previously proposed casings and does not have the disadvantages thereof. More specifically, it is an object of the invention to provide a casing which lies substantially wrinkle-free against the sausage material after the boiling or scalding treatment and subsequent cooling, can be manufactured cheaply and simply, i.e. is readily extrudable, even together with other plastics materials, and can easily be stretched for further improving the mechanical properties.

The present invention provides a food casing, more especially a sausage casing, having at least one layer made of a special polyurethane elastomer, and also provides the polyurethane itself. Advantageously the casing consists of a single layer only. The invention also extends, however, to multi-layer casings of which at least one layer, preferably the outer or outermost layer, comprises the special polyurethane. Thus, in order to improve certain properties of the casing, such as impermeability to gas and water, a multi-layer casing can be formed by co-extrusion of the special polyurethane elastomer with one or more other materials.

The polyurethane elastomers used for food casings according to the invention, especially sausage casings, are new and combine, in a unique manner, the properties of an elastomer (high elasticity) with those of a thermoplast (high strength). It is well known that polyurethane elastomers will be manufactured mainly from diisocyanates, higher molecular polyols (preferably polyester and/or polyether polyols) and lower molecular polyols (preferably glycols) as chain-extenders.

The elastic polyurethane moulding compositions according to the invention are characterized in that the polyol and diisocyanate base units consist to a substantial extent of linear, aliphatic $C_6$-units and the higher molecular polyols and diisocyanates are present in an equivalent ratio of from approximately 1:3.5 to 1:70, preferably 1:10 to 1:50 and especially 1:15 to 1:30 and a weight-quantity ratio of approximately 1:0.4 to 1:4.0 preferably 1:0.6 to 1:3.5 especially 1:0.8 to 1:3.0, together with lower molecular weight chain extenders that contain active hydrogen atoms (many examples of which are known per se, for example lower molecular glycols), in a ratio of equivalents of about 5:1 to 70:1 preferably 7:1 to 60:1 especially 9:1 to 50:1 based on the higher molecular polyol constituents, in which the lower molecular weight chain lengtheners may contain only up to approximately 50 mole-% of linear aliphatic $C_6$-units.

Advantageously, the elastic polyurethane moulding compositions used for food casings according to the invention have a molecular weight of 2000 or more. In the manufacture of the moulding compositions according to the invention preferably high molecular polyester and/or polyether polyols with a molecular weight of 500 or more are employed. Advantageously, the $C_6$-units in the higher molecular polyol component of the polyurethane are in uniform sequence, that is to say, other fundamental units, for example $C_2$ or $C_4$-units should not be present in the polyol component to any noticeable extent, whether in regular or irregular sequence. It can be advantageous if the chain extenders also contain linear, aliphatic $C_6$-units in the described manner, wherein the proportion of $C_6$-units in this case should be up to approximately 50 mole % only and the rest should be glycols, preferably ethylene glycol, 1,2 and/or 1,3-propanediol and/or 1,4-butanediol and/or neopentyl glycol. Preferably, the polyol component in polyurethane moulding compositions contains a polyester, more especially one obtained from ε-caprolactone. Also preferred are moulding compositions in which the polyester is obtained from adipic acid and 1,6-hexanediol. Hexamethylene diisocyanate is especially suitable as diisocyanate base unit in the moulding compositions used in accordance with the invention.

The polyurethanes of the invention advantageously have base units, more especially the polyol and diisocyanate base units, comprising a major proportion of linear $C_6$ aliphatic units, preferably consisting mainly of such units.

The manufacture of polyurethane moulding compositions usable for making food casings according to the invention is advantageously carried out in a "One-shot process." The constituents chain-extender (e.g., glycols), polyol (e.g., hydroxy-terminated polyester) and diisocyanate are weighed together and heated in the reaction vessel while stirring. After completion of the exothermic reaction and cooling, the product, preferably cast to form a plate, can be granulated.

Polyurethanes have in principle not been taken into consideration hitherto for sausage casings that are in direct contact with the consumable sausage content, since they are generally not resistant to hydrolysis and release to the foodstuffs a high proportion of constituents which are forbidden according to laws relating to foodstuffs. In addition, elastic polyurethanes have hitherto been regarded as unsuitable for sausage casings on account of having too pronounced a stickiness during processing, since tubular films produced from previous polyurethanes, even a relatively long time after extrusion, are so sticky that the flattened tubular film sticks together and furthermore, the individual turns of the tubular sheet likewise stick together on the supply roll. Consequently the handling thereof as sausage casings, particularly the subsequent filling, is made extremely difficult.

Surprisingly, the polyurethane moulding compositions according to the invention have a high resistance to hydrolysis. In addition, they possess a high resistance to other solvents, and to fats, and release to the surrounding medium only infinitely small amounts of their constituents, thus meeting the legal requirements regarding foodstuffs. Furthermore, the polyurethane moulding compositions used according to the invention can be extruded to form food casings without any undesirable sticking. In spite of the low tendency to stick, the moulding compositions of the invention can nevertheless be co-extruded very well with other thermoplasts to form multi-layer films (owing to their broad melting range of approximately 180° to 220° C.,) if a modification of the properties of the single sheet film is desired. An important factor is that co-extrusion is possible without using an adhesion promoter. As a result of the relatively broad melting range, the polyurethane moulding compositions according to the invention are particularly suitable for the blow extrusion preferred for the manufacture of sausage casings. Owing to their special properties, the moulding compositions according to the invention meet the following two essential requirements for processing in the blow extrusion process:

1. faultless drawing and inflation to form a tubular film in a continuous process and
2. the sheet can be turned round and wound up, without sticking, only a few seconds after emerging from the nozzle.

A sausage casing according to the invention fits practically wrinkle-free after scalding/boiling and re-cooling, and there is virtually no detachment of the sausage material from the wall of the sausage casing. These properties stem, surprisingly, from the unique combination of elastic properties and strength of the polyurethane moulding compositions used as starting material for the sausage casing according to the invention. Some of the most important properties of the polyurethane moulding compositions, as regards use as a sausage casing material, lie in the following range:

| | |
|---|---|
| Shore hardness | 50 to 80, preferably 60 to 70 |
| Tensile strength (N/mm²) | measured in a film 50μ thick 25 to 80, preferably 30 to 70 |
| Elongation at break (%) | 100 to 400, preferably 150 to 350 |
| Stress value at 50% elongation (N/mm²) | 15 to 50, preferably 20 to 40 |
| Stress value at 100% elongation (N/mm²) | 20 to 45, preferably 25 to 35 |
| shear modulus at 0° C. | 4000–5000 kp/cm² preferably 4400–4600 kp/cm² in particular approximately 4500 kp/cm² |
| shear modulus at 20° C. | 2000–3000 kp/cm² preferably 2500–2700 kp/cm² in particular approximately 2600 kp/cm² |
| Glass temperature | −30 to −70, preferably −40 to −60° C. |

As a result of the high elasticity, which the polyurethanes of the invention exhibit even at temperatures below room temperature (low transition temperature) a wrinkle-free fit of the sausage casing is guaranteed also at relatively low temperatures, even as far as below room temperature. The good strength properties enable a further requirement made of the sausage casing to be met, namely its dimensional stability, as a result of which pear-shaped buckling is avoided.

The manufacture of a food (especially sausage) casing according to the invention is effected by extrusion of the polyurethane moulding compositions, preferably according to the blow extrusion process. The moulding compositions can be heated and shaped on a known blow extruder.

The properties of the extruded casing may be further improved by biaxial stretching. The longitudinal stretching is advantageously carried out with stretching ratios in the range of approximately 1:1 to 1:4, preferably from 1:1.5 to 1:3, whilst the transverse stretching is also preferable carried out with stretching ratios in the range of approximately 1:1 to 1:4.

As already mentioned, the polyurethane moulding compositions have a comparatively broad melting range. This can be controlled as desired in the range of from approximately 150° to 250° C., for example by varying the ratio of the NCO-groups to the OH-groups in the starting components of the polyurethane within a small range, for example between 1.00 and 0.95. Owing to this broad melting range, polyurethane moulding compositions of the invention may be coextruded with other plastics materials, for example with polyethylene, PVC, PVDC, polyamides and polyesters, without adhesion promoters, to form two-layer or three-layer films, provided of course that the processing range of the other thermoplasts lies in the processing range of the polyurethane moulding compositions used in accordance with the invention. By the combination with other plastics materials, it is possible to increase even further the advantages of the polyurethanes used according to the invention.

The thickness of casings according to the invention may be in the range of from 20μ to 150μ. Typical plastics material sausage casings have a thickness of approximately 30 to 70 μm, preferably 40 to 50 μm. In the case of multi-layer films the ratio of the thickness of the inner layer to that of the outer layer may be in the range of from approximately 1:1 to 1:6, and a ratio of 1 (inner layer) to 3 (outer layer) should prove optimal for most types of sausage. The thickness of multi-layer films is typically about 40 to 60 μm and is therefore of the same order as the customary one layer films.

To summarize, casings according to the invention offer the following advantages:

1. Owing to their adequate crystallisability they can be wound up immediately after extrusion and do not stick or clog.
2. Equally beneficial they have a very high elasticity, which can be further improved by biaxial stretching.
3. Their mechanical properties are, throughout, generally better than the conventional plastics such as, for example, sheets of polyethylene, polyamide, polyvinylchloride, and unstretched polyester. A further considerable increase in strength can be achieved by biaxial stretching.
4. The starting material for the polyurethane sausage casings according to the invention is currently cheaper than that for the previously proposed casings of polyamide 12 or polyvinylidene chloride.
5. The chemistry of the starting material renders possible a broad modification of the tubular casing as desired, for example softer and harder types, higher and lower elasticity, easy colourability, processing without further additives, etc.
6. Since the polyurethane casing can be produced without using additives, the risk of monomeric additive substances that are considered legally harmful exuding into the food material (e.g. sausage meat) is practically non-existent.
7. The casing can be made with a minimal permeability to gas and a low permeability to water vapour.
8. The casing according to the invention is, very resistant to hydrolysis especially in comparison with known polyurethane films, and therefore suitable as a casing for boiling and scalding sausage.
9. The casing according to the invention lies taut and absolutely wrinkle-free against the food material content.
10. It has a supple, soft feel.
11. The casings according to the invention have little or no smell or taste, and can be easily extruded over a wide temperature range (say, 180° to 235° C.). It is precisely in this property that casings according to the invention are superior to the known polyvinylidene chloride sausage casings which not only have an unpleasant smell, since they contain additives and anti-clogging agents, but also can be extruded only with difficulty and within narrow temperature limits.
12. The casings receive print well.
13. The casings may be heat-sealed and fused. In comparison with other plastics films they have good adhesion and can therefore be coextruded very well.
14. The casings according to the invention can be harmless to the environment since when waste is destroyed by combustion offensive chlorine compounds are in general not evolved. By contrast, the previously proposed polyvinylidene chloride casings split off hydrochloric acid when heated.
15. The casings have such a good tear propagation resistance that steeping is possible.

Although the following Examples refer primarily to the polyurethane of the invention and their use in sausage casings, similar considerations will apply to other food aasings.

The following Examples illustrate the invention:

(A) MANUFACTURE OF THE POLYURETHANE MOULDING COMPOSITION USED AS STARTING MATERIAL

EXAMPLE I

Composition of the PUR-starting mixture (PUR-elastic polyurethane moulding composition used in accordance with the invention)

24.00 parts by weight of polycaprolactone having a molecular weight of 2000 ($H_2O$ content: 0.03%)
50.40 parts by weight of 1,6-hexamethylene-diisocyanate
26.46 parts by weight of 1,4-butanediol
Equivalent ratio of higher molecular polyol to diisocyanate=1.25
Equivalent ratio of chain-extender to higher molecular polyol=24.5:1

Method of Manufacture

The manufacture is effected in a one-shot process. 1,4-Butanediol, polycaprolactone and diisocyanate are heated to 60° C., while stirring, in a reaction vessel. As a result of exothermic reaction the temperature increases to 240° C. in approximately 10 minutes. At that temperature, the product is cast onto a polytetrafluoroethylene film. After approximately 5 hours the plate can be granulated.

EXAMPLE II

Composition of the PUR-mixture 27.00 parts by weight of polycaproplactone having a molecular weight of 2000 ($H_2O$ content: 0.03%)
50.40 parts by weight of 1,6-hexamethylene-diisocyanate
26.32 parts by weight of 1,4-butanediol
Equivalent ratio of higher molecular polyol to diisocyanate=1:22.2
Equivalent ratio of chain-extender to higher molecular polyol=21.7:1

The manufacture is carried out as described in Example I.

EXAMPLE III

Composition of the PUR-mixture 24.00 parts by weight of polycaprolactone having a molecular weight of 4000 ($H_2O$ content: 0.03%)
50.40 parts by weight of 1,6-hexamethylene-diisocyanate
27.00 parts by weight of 1,4-butanediol
Equivalent ratio of higher molecular polyol to diisocyanate=1:50
Equivalent ratio of chain-extender to higher molecular polyol=50:1

The manufacture is carried out as described in Example I.

Example IV

Composition of the PUR-mixture 30.00 parts by weight of polycaprolactone having a molecular weight of 1000 ($H_2O$ content: 0.03%)
50.40 parts by weight of 1,6-hexamethylene-diisocyanate
24.84 parts by weight of 1,4-butanediol
Equivalent ratio of higher molecular polyol to diisocyanate=1:10
Equivalent ratio of chain-extender to higher molecular polyol=9.2:1

The manufacture is carried out as described in Example I.

(B) MANUFACTURE OF SAUSAGE CASINGS ACCORDING TO THE INVENTION

The moulding compositions of the Examples (A) I to IV are extruded according to the blow-film process, in a manner known per se, to form one-layer, unstretched sausage casings, the moulding compositions I and III as well as II and IV being extruded, respectively, under the conditions described below:

Moulding compositions I+III

The predried polyurethane granulate having a residual moisture content of 0.05% is extruded on a Reifenhauser extruder having a screw diameter of 30 mm, a screw length of 20 D, a retro extruder head and a nozzle opening of 1.0 mm. The extruder has no parts that are especially protected against corrosion. Looking in the direction of extrusion the following temperatures are established: 200° C., 210° C., 220° C., 225° C., 220° C. The screw conveys at a speed of 60 rev/min. The output of melt obtained thereby permits a discharge speed of 12 m/min, the mean wall thickness of the extruded casing being approximately 50 $\mu$m. The diameter of the tube is 60 mm. The fluctuations in the wall thickness are limited by adjusting the nozzle opening to ±8%. The melt is cooled to below the solidifcation point with cooled air, drawn-off, flattened and wound up. Drawing off and winding up are carried out in the conventional manner.

The length of the air bubble between the extruder nozzle and the nip roller is approximately 2 m. The flattened tube can be wound up immediately. The risk of clogging, even without injecting a separator, for example an oil or dust suitable for foodstuffs, does not arise.

Moulding compositions II+IV

The predried polyurethane granulate having a residual moisture of 0.05% is extruded on a Reifenhauser extruder having a screw diameter of 20 mm, a screw length of 20 D, a retro extruder head and a nozzle opening of 1.0 mm. The extruder has no parts that are especially protected against corrosion. Looking in the direction of extrusion, the following temperatures are established: 180° C., 190° C., 200° C., 215° C., 210° C. The screw conveys at a speed of 50 rev/min. The output obtained thereby permits a draw-off speed of 10 m/min the mean wall thickness being 45 $\mu$m±8% and the tube diameter amounting to 60 mm. The melt is cooled to below the solidifcation point with cooled air. The air bubble as far as the nip roller has a length of 2 m. The flattened tube may be wound up immediately, without there being any risk of clogging.

Relevant physical properties of the films I' to IV' obtained from the moulding compositions I to IV are set out in Table I below:

TABLE I

|  | Sausage casing I' | | Sausage casing II' | | Sausage casing III' | | Sausage casing IV' | |
|---|---|---|---|---|---|---|---|---|
|  | longitudinal | transverse | longitudinal | transverse | longitudinal | transverse | longitudinal | transverse |
| Tensile strength (N/mm$^2$) | 50 | 35 | 42 | 36 | 36 | 36 | 48 | 37 |
| Stress value at 50% Elongation (N/mm$^2$) | 30 | 23 | 27 | 24 | 26 | 26 | 28 | 24 |
| Stress value at 100% Elongation (N/mm$^2$) | 35 | 26 | 32 | 26 | 29 | 27 | 34 | 25 |
| Elongation at break (%) | 260 | 250 | 200 | 350 | 180 | 300 | 200 | 330 |

Surprisingly, sausage casings produced from the polyurethane moulding compositions used in accordance with the invention show unexpectedly high resistance to the action of water, dilute acetic acid, 10% ethanol and coconut oil. Table II below shows the results of migration tests on a sausage casing according to Example I. The individual migration tests were carried out under the conditions laid down by the Bundesgesundheitsamt (BGA) (Federal Health Office) (Bundesgesundheitsblatt, 1970, No. 14, page 203–204, note 15). The test showed that in each case less than the permissible amount, i.e. less than 6 mg of migrating substance, was released per dm$^2$ of film surface (Supplement to Kunsstoffempfehlung of 1.31975). Consequently, subject to the express agreement of the BGA, the requirements to be met by plastics materials in the foodstuff trade are fulfilled.

TABLE II

Migration tests

| Test material | test temperature (°C.) | test duration (hours) | distilled water ** | 3% by wt. CH$_3$COOH *** | 10% by vol. C$_2$H$_5$OH **** | purified coconut oil ***** |
|---|---|---|---|---|---|---|
| Sausage casing according to Example I | 40 | 10 × 24 | 2.9 mg/dm$^2$ | | | |
| Calibre 50 φ | 70 | 2 | | | 3.8 mg/dm$^2$ | |
| Wall thickness 43–47 μ | 100 | ½ | 5.5 mg/dm$^2$ | 4.2 mg/dm$^2$ | | 4.2 mg/dm$^2$ |
| | 121 | ½ | | | | 4.6 mg/dm$^2$ |

*The following extraction agents are used as foodstuff simulants
**distilled and de-ionised water (with specific conductivity data and blank test)
***3% by weight of acetic acid (CH$_3$COOH) (starting from a degree of purity p.a.≙ per analysis)
****10% by volume of ethyl alcohol (C$_2$H$_5$OH) (starting from a degree of purity p.a.≙ per analysis)
*****purified[1] coconut oil (1 ≙ purification of coconut oil; of. Bundesgesundheitsblatt 1970, No. 14 page 203-204) Ground nut oil or triglycerides (esters of glycerol with fatty acids of medium chain length) The calibration of the specimen is to be determined by a blank test.

A further surprising advantage of sausage casings according to the invention in comparison with the conventional sausage casings of thermoplastic synthetic materials, for example, polyamide, resides in the fact that the strength properties at elevated temperatures that correspond approximately to the temperatures of the boiling or scalding treatment, are reduced by a much lesser extent than the corresponding values of the polyamide. In table III below, $\delta_s$ at 20° C. and 80° C. for sausage casings of polyurethane according to the invention, and for sausage casings of polyamide 12, are compared.

TABLE III

| 20° C. | PUR unstretched | | polyamide 12 unstretched | |
|---|---|---|---|---|
|  | longitudinal | transverse | longitudinal | transverse |
| $\delta_s$ (N/mm$^2$) | 28 | 30 | 36 | 30 |
| $\epsilon_s$ (%) | 22 | 10 | 9 | 8.5 |

| 80° C. | PUR unstretched | | polyamide 12 unstretched | |
|---|---|---|---|---|
|  | longitudinal | transverse | longitudinal | transverse |

TABLE III-continued

| $\delta_s$ (N/mm$^2$) | 10 | 15 | 8 | 7.8 |
| $\epsilon_s$ (%) | 16 | 14 | 17 | 17 |

The significance of these results is that sausage casings according to the invention do not deform on scalding.

(C) MANUFACTURE OF A BIAXIALLY STRETCHED, ONE-LAYER SAUSAGE CASING:

The biaxial stretching is carried out by methods known per se.

Predried granulated polyurethane made as described in Example I and having a residual moisture content of 0.05% is extruded on a Reifenhauser extruder having a screw diameter of 30 mm, a screw length of 20 D, a retro extruder head and a nozzle opening of 1.0 mm. The extruder has no parts that are especially protected against corrosion. Looking in the direction of extrusion, the following temperatures are established: 200° C., 210° C., 220° C., 225° C., and 220° C. The screw conveys at a speed of 60 rev/min. The emerging melt is cooled. By means of an air line passing through the extruder head, the cooled tube is inflated. The further transport of the tubular film, having a thickness of approximately 200 μm, is effected by a pair of rollers after which there is arranged a heating path for reheating. There the casing is brought continuously to the stretching temperature of approximately 105° C. As a result of the compressed air supplied, the casing is inflated radially in the ratio 1:2, whilst being simultaneously stretched in the longitudinal direction in the ratio of 1:2 by a second pair of rollers arranged after the heating device in the direction of transport, which pair of rollers draws off the casing at a speed which is double that of the first pair of roller and simultaneously nips it. The transverse stretching is controlled in accordance with the diameter by means of the enclosed volume of air, using a pressure regulating valve. The final wall thickness amounts to 45 μm±10%. The diameter of the stretched casing is 60 mm. The film thus obtained is subjected to a traction test according to DIN 53455 at 20° and 80° C. The values obtained for the stretching stress and elongation are compared in Table IV below with the corresponding values for an unstretched casing according to the invention. The results of the traction tests show that a surprisingly large improvement in tensile strength, i.e. 3 to 4 times that of the casing in the unstretched state, is obtained by means of the described stretching. Furthermore, the proportion of amorphous regions is reduced by the stretching, so that impermeability to gas, as well as to water and fat, is increased considerably. Since the molecular orientation is frozen in the film by means of intense cooling directly after stretching an improved transparency is obtained. During the manufacture at 70° to 85° C. of scalding and boiling sausages, shrinking forces are released which makes it possible during cooling for the sausage casing to follow the volume contraction that takes place in the sausage material until the cold storage temperature is reached.

TABLE IV 1. at 20° C.

| | PUR according to Example 1 unstretched | | PUR according to Example I stretched | | PVdC stretched | |
|---|---|---|---|---|---|---|
| | longi-tudinal | trans-verse | longi-tudinal | trans-verse | longi-tudinal | trans-verse |
| yield stress $\delta S$ [N/mm$^2$] | 28 | 30 | 95 | 65 | 55 | 93 |
| elongation $\epsilon S$ (%) | 22 | 10 | 62 | 45 | 68 | 50 |

2. at 80° C.

| | PUR according to Example 1 unstretched | | PUR according to Example I stretched | | PVdC stretched | |
|---|---|---|---|---|---|---|
| | longi-tudinal | trans-verse | longi-tudinal | trans-verse | longi-tudinal | trans-verse |
| yield stress $\delta S$ [N/mm$^2$] | 10 | 15 | 51 | 48 | 40 | 41 |
| elongation $\epsilon \vartheta$ [%] | 16 | 14 | 70 | 60 | 88 | 45 |

(D) MANUFACTURE OF MULTI-LAYER SAUSAGE CASINGS BY COEXTRUSION WITH OTHER PLASTICS MATERIALS

Polyurethane can be coextruded inter alia with polyacrylonitrile copolymers, polyamide and polyethylene.

In order to improve the impermeability to water-vapour and oxygen in an unstretched polyurethane casing, the above materials are combined with PUR according to the invention.

EXAMPLE 1

PUR/polyamide 12

PUR according to Example I on the outside and PA (polyamide) 12 on the inside are coextruded on a Baroflex plant according to U.S. Pat. No. 3,642,397.

| Extr. I PUR according to Example I | |
|---|---|
| screw diameter | 30 mm |
| screw length | 21 D |
| rotational speed | 60 min$^{-1}$ |
| cylinder temperature | 220° C. 220° C. |
| adapter | 240° C. |

| -continued | |
|---|---|
| Extr. II PA | |
| screw diameter | 30 mm |
| screw length | 21 D |
| rotational speed | 40 min$^{-1}$ |
| cylinder temperature | 280° C. 270° C. |
| adapter | 250° C. |
| head | 220° C. |
| nozzle | 225° C. |

The two melts are combined outside the nozzle. The tube is cooled down by blowing air against the film and conveyed by way of a pair of draw-off rollers to the winding up station. The wall thickness of the film is 50μ, PUR being 35μ and PA 12 15μ thick.

| Gas permeability of the 50 μ thick composite tubular film | | | |
|---|---|---|---|
| Test with | Measuring process | Measured value | Unit |
| Water vapour (20° C./85% RH) | DIN 53122 | 4.5 | $\frac{g \cdot day}{day \cdot m^2}$ |
| Water vapour (30° C./90% RH) | BS 1133 | 20 | $\frac{g \cdot day}{day \cdot m^2}$ |
| Nitrogen | ASTM D 1434 | 0.8 | $\frac{cm^3 \, bar}{day \cdot dm^2}$ |
| Oxygen | ASTM D 1434 | 3.5 | $\frac{cm^3 \, bar}{day \cdot dm^2}$ |
| Carbon dioxide | ASTM D 1434 | 10 | $\frac{cm^3 \, bar}{day \cdot dm^2}$ |

The strength of adhesion of the two film layers is judged moderate to good and is adequate for the sausage casing according to the invention.

EXAMPLE 2

PUR/Barex

PUR outside, polyacrylonitrile copolymer with methyl acrylate and butadiene (trade name "Barex", Lonza AG) inside.

| Extr. 1 PUR according to Example I | |
|---|---|
| screw diameter | 30 mm |
| screw length | 21 D |
| rotational speed | 60 min$^{-1}$ |
| cylinder temperature | 210° C. 215° C. |
| adapter | 215° C. |
| | |
| Extr. II Barex | |
| screw diameter | 30 mm |
| screw length | 21 D |
| rotational speed | 30 min$^{-1}$ |
| cylinder temperature | 180° C. 195° C. |
| adapter | 200° C. |
| head | 200° C. |
| nozzle | 205° C. |

The two melts are combined outside the nozzle. The tube is cooled down by blowing air against the film and conveyed by way of a pair of draw-off rollers to the winding up station. The wall thickness of the film is 50μ, PUR being 35μ and Barex 15μ thick.

| Gas permeability of the 50 μ thick composite film | | | |
|---|---|---|---|
| Tested with | Measuring process | Measured value | Unit |
| Water vapour (38° C./90% RH) | ASTM E 96-63/method E | 5.8 | $\frac{g \cdot 0.001 \text{ in}}{100 \text{ in}^2 \cdot 24 \text{ hr}}$ |
| Oxygen (23° C.) | ASTM D 1434 | 1.0 | $\frac{cm^3 \cdot 0.001 \text{ in}}{100 \text{ in}^2 \cdot 24hr \cdot atm}$ |
| Carbon dioxide (23° C.) | ASTM D 1434 | 1.5 | $\frac{cm^3 \cdot 0.001 \text{ in}}{100 \text{ in}^2 \cdot 24hr \cdot atm}$ |
| Nitrogen (23° C.) | ASTM D 1434 | 0.4 | $\frac{cm^3 \cdot 0.001 \text{ in}}{100 \text{ in}^2 \cdot 24hr \cdot atm}$ |

The adhesion between the two layers is better than in Example 3 but not as good as in Example 1.

EXAMPLE 3

PUR/Polyethylene

PUR outside, polyethylene inside.

| Extr. I PUR according to Example I | |
|---|---|
| screw diameter | 30 mm |
| screw length | 21 D |
| rotational speed | 60 min$^{-1}$ |
| cylinder temperature | 210° C., 215° C. |
| adapter | 215° C. |
| Extr. II Polyethylene | Density: 0.94–0.96 |
| screw diameter | 30 mm |
| screw length | 21 D |
| rotational speed | 30 min$^{-1}$ |
| cylinder temperature | 180° C., 200° C. |
| adapter | 200° C. |
| head | 205° C. |
| nozzle | 210° C. |

The two melts are combined outside the nozzle. The tube is cooled down by blowing air against the film and conveyed by way of a pair of draw-off rollers to the winding up station. The wall thickness of the film is 50μ, PUR being 35μ and polyethylene 15μ thick.

| Gas permeability of the 50 μ thick composite film | | | |
|---|---|---|---|
| Tested with | Measuring process | Measured value | Unit |
| Water vapour (38° C./90% RH) | ASTM E 96-63 method E | 0.3 | $\frac{g \cdot 0.001 \text{ in}}{100 \text{ in}^2 \cdot 24 \text{ hr}}$ |
| Oxygen (23° C.) | ASTM D 1434 | 180 | $\frac{g \cdot 0.001 \text{ in}}{100 \text{ in}^2 \cdot 24hr \cdot atm}$ |
| Carbon dioxide (23° C.) | ASTM D 1434 | 500 | $\frac{g \cdot 0.001 \text{ in}}{100 \text{ in}^2 \cdot 24hr \cdot atm}$ |
| Nitrogen (23° C.) | ASTM D 1434 | not measured | not measured |

The strength of adhesion of the two layers is rather low, but is adequate for a sausage casing.

We claim:

1. A polyurethane elastomer exhibiting thermoplastic properties on processing, the polyurethane consisting essentially of base units derived from the reaction of
   (a) at least one high molecular weight diol,
   (b) at least one di-isocyanate, and
   (c) at least one low molecular weight glycol as chain-extender, both the base units derived from both the high molecular weight diol and the di-isocyanate consisting essentially of linear C$_6$-aliphatic units, the equivalent ratio of high molecular diol to di-isocyanate base units being in the range of approximately 1:3.5 to 1:70, the quantity-weight ratio of said base units being in the range of from approximately 1:0.4 to 1:4.0, respectively, the equivalent ratio of the low molecular glycol to high molecular diol being from approximately 5:1 to 70:1, the chain extender comprising no more than approximately 50 mole-% of linear C$_6$-aliphatic units.

2. A material according to claim 1 in which the low molecular weight glycol includes 1,6 hexanediol in a proportion of no more than 50 mole percent.

3. A material according to claim 2 in which the remaining glycol component of the low molecular weight glycol is selected from the group consisting of ethylene glycol, 1,2-propanediol, 1,3-propanediol, 1,4-butanediol and neopentyl glycol.

4. A material according to claim 1, in which the di-isocyanate comprises 1,6-hexamethylene di-isocyanate.

5. A material according to claim 1, wherein the chain-extender comprises at least one low molecular-weight glycol.

6. A material according to claim 5, wherein the chain-extender comprises 1,4-butanediol.

7. A material according to claim 6, wherein the chain-extender comprises 1,4-butanediol, in combination with 1,6-hexanediol.

8. A material according to claim 1, in which the polyurethane has a molecular weight of at least 2,000.

9. A material according to claim 1, the equivalent ratio of high molecular weight diol to di-isocyanate base units in the polyurethane being in the range of from approximately 1:10 to 1:50, and the quantity weight ratio of said base units being in the range of from approximately 1:0.6 to 1:3.5 and the equivalent ratio of the chain-extender to the high molecular weight diol being 7:1 to 60:1.

10. A material according to claim 1, the equivalent ratio of high molecular weight diol to di-isocyanate base units of the polyurethane being in the range of 1:15 to 1:30, the quantity weight ratio of said base units being in the range of approximately 1:0.8 to 1:3.0 and the equivalent ratio of the chain extender to the high molecular weight diol being in the range of from approximately 9:1 to 50:1.

11. A material according to claim 1, characterized in that at least one layer comprises a polyurethane elastomer which is derived from high molecular weight diols of a molecular weight of 500 or more.

12. A material according to claim 1, in which the high molecular weight diol consists essentially of a polyester diol.

13. A material according to claim 12, wherein the polyester diol is based on adipic acid and 1,6-hexanediol.

14. A material according to claim 12, wherein the polyester diol is based on poly-ε-caprolactone.

15. A material according to claim 12, wherein the polyester diol is based on adipic acid and 1,6-hexanediol and a further diol, wherein the 1,6-hexanediol constitutes a major portion of the diol component of the polyester.

16. A material according to claim 12, wherein the polyester diol comprises poly-ε-caprolactone.

17. A material according to claim 1, wherein the ratio of NCO groups to OH groups is in the range of 0.95 to 1.00.

18. A material according to claim 1, wherein the polyurethane is prepared by simultaneously reacting (a) said high molecular weight diol, (b) said di-isocyanate, and (c) said chain extender in a reaction vessel.

* * * * *

UNITED STATES PATENT AND TRADEMARK OFFICE
CERTIFICATE OF CORRECTION

PATENT NO. : 4,174,436
DATED : November 13, 1979
INVENTOR(S) : Korlatzki et al.

It is certified that error appears in the above-identified patent and that said Letters Patent are hereby corrected as shown below:

First page, Item 75, "Schumacher" should be --Schuhmacher--;

First page, lines 6 and 7 of the ABSTRACT, "polyruethane" should read --polyurethane--;

Col. 6, line 67, "aasings" should read --casings--;

Col. 12, line 24, "g.day" should read -- g --;

Col. 12, line 26, "g.day" should read -- g --.

Signed and Sealed this

Eighteenth Day of March 1980

[SEAL]

Attest:

Attesting Officer

SIDNEY A. DIAMOND

Commissioner of Patents and Trademarks